(No Model.) 5 Sheets—Sheet 1.
E. L. W. HASKETT-SMITH.
RANGE FINDER.

No. 470,487. Patented Mar. 8, 1892.

Witnesses
John Revell
George Baumann

Inventor
Edmund L. W. Haskett-Smith
By his Attys.
Howson and Howson (No Model.)
E. L. W. HASKETT-SMITH.
RANGE FINDER.
No. 470,487.                    Patented Mar. 8, 1892.
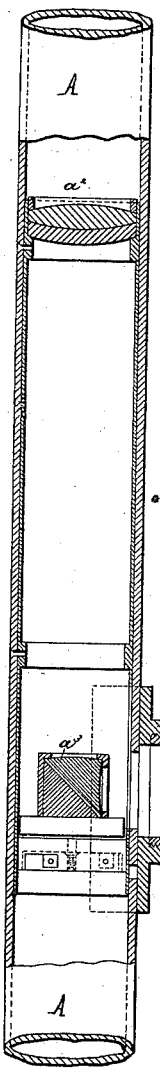
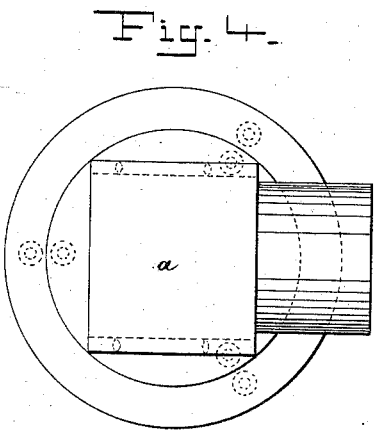
Fig. 4.
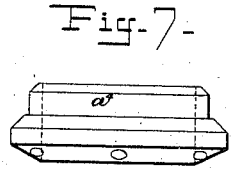
Fig. 7.
Fig. 13.
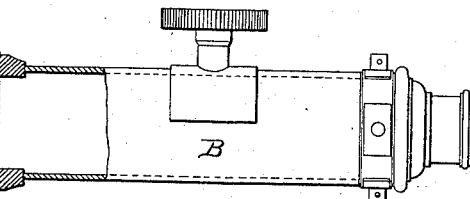
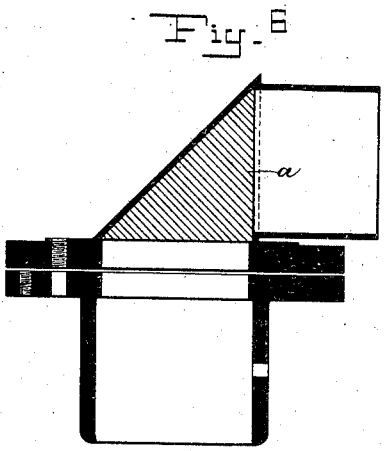
Fig. 5.        Fig. 6.
WITNESSES:                INVENTOR
George Baumann            Edmund L. W. Haskett-Smith
James Gracie              BY
                          Howson & Howson
                          ATTORNEYS.

(No Model.)　　　　　　　　　　　　　　　　5 Sheets—Sheet 3.
E. L. W. HASKETT-SMITH.
RANGE FINDER.

No. 470,487.　　　　　　　　　　Patented Mar. 8, 1892.

Witnesses
John Revell
George Baumann

Inventor
Edmund L. W. Haskett-Smith
By his Attorneys
Howson and Howson

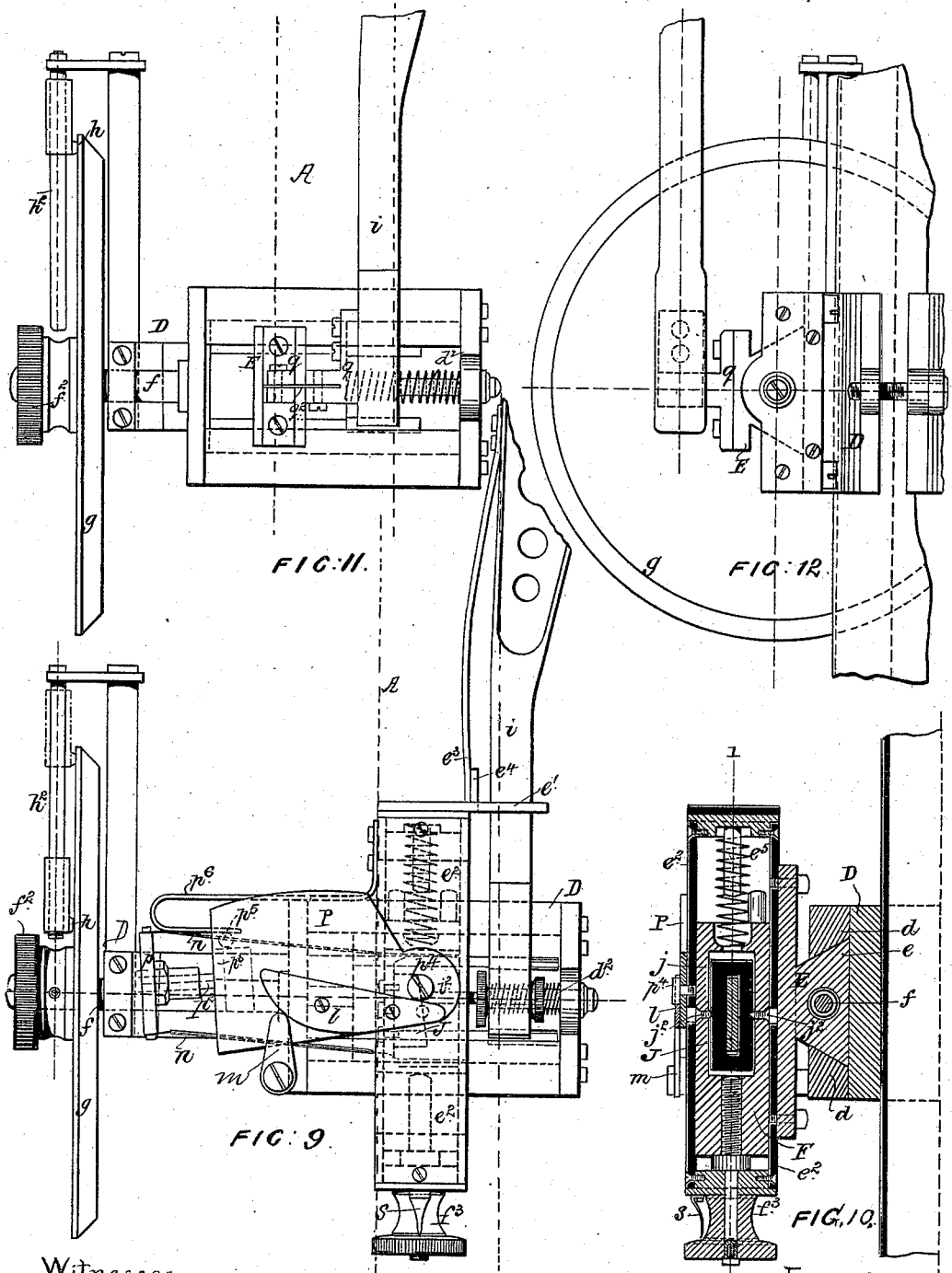

(No Model.) 5 Sheets—Sheet 5.
E. L. W. HASKETT-SMITH.
RANGE FINDER.
No. 470,487. Patented Mar. 8, 1892.
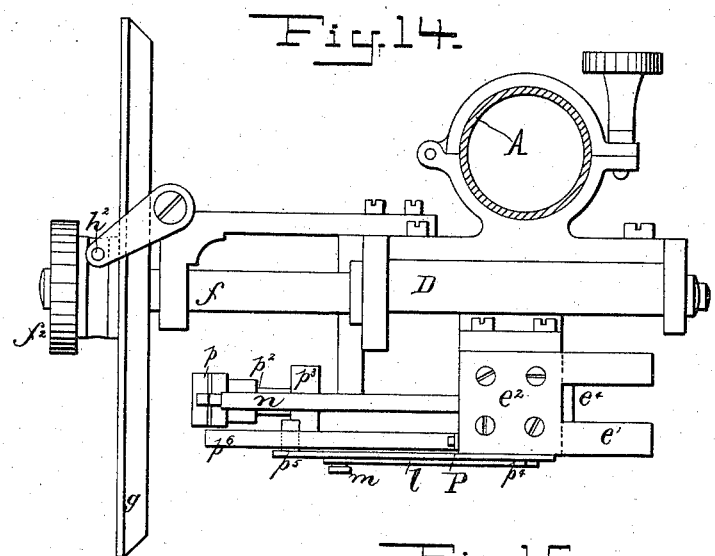
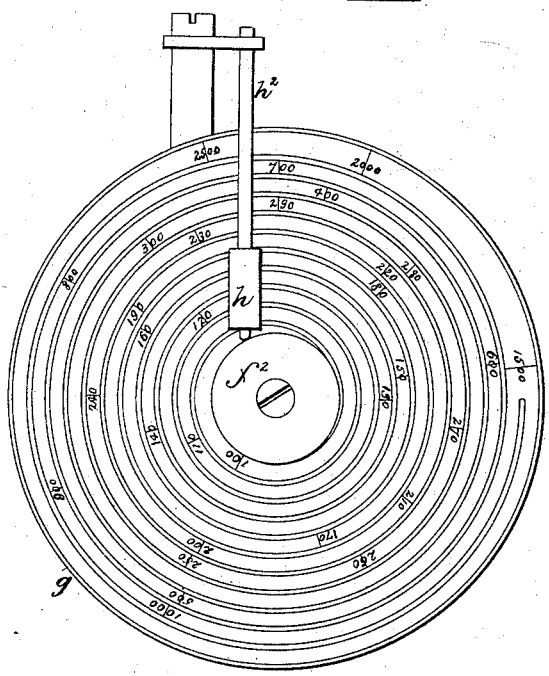
WITNESSES:
George Baumann
James Gracie
INVENTOR:
E. L. W. Haskett-Smith
BY Howson and Howson
his ATTORNEYS.

UNITED STATES PATENT OFFICE.

EDMUND L. W. HASKETT-SMITH, OF WESTMINSTER, ENGLAND.

RANGE-FINDER.

SPECIFICATION forming part of Letters Patent No. 470,487, dated March 8, 1892.

Application filed May 20, 1890. Serial No. 352,535. (No model.) Patented in England September 8, 1888, No. 13,021; in France July 15, 1889, No. 199,590; in Germany July 24, 1889, No. 50,670; in Italy October 7, 1889, LI, 329; in India January 18, 1890, No. 333; in Austria-Hungary January 23, 1890, No. 30,644 and No. 59,938, and in Canada February 17, 1890, No. 33,735.

*To all whom it may concern:*

Be it known that I, EDMUND LYONS WELLESLEY HASKETT-SMITH, civil engineer, a subject of the Queen of Great Britain and Ireland, residing at 6 Queen Anne's Gate, in the city of Westminster, England, have invented certain Improvements in Telemeters or Range-Finders, (for which I have obtained patents in Great Britain, No. 13,021, dated September 8, 1888; in France, No. 199,590, dated July 15, 1889; in Germany, No. 50,670, dated July 24, 1889; in Austria-Hungary, No. 30,644 and No. 59,938, dated January 23, 1890; in Italy, Vol. 51, No. 329, dated October 7, 1889; in Canada, No. 33,735, dated February 17, 1890, and in India, Reg. No. 333 of 1889, dated January 18, 1890,) of which the following is a specification.

The object of my invention is to provide a telemeter or range-finder by which the distance of objects from the observer can be found expeditiously and with practical accuracy by direct indications on scales carried by the instrument, so as to obviate the necessity for calculation or reference to tables of tangents.

It also presents the advantage of the observation being made by means of two telescopes to which the observer applies his eyes, as in using an ordinary binocular glass.

Figure 1:
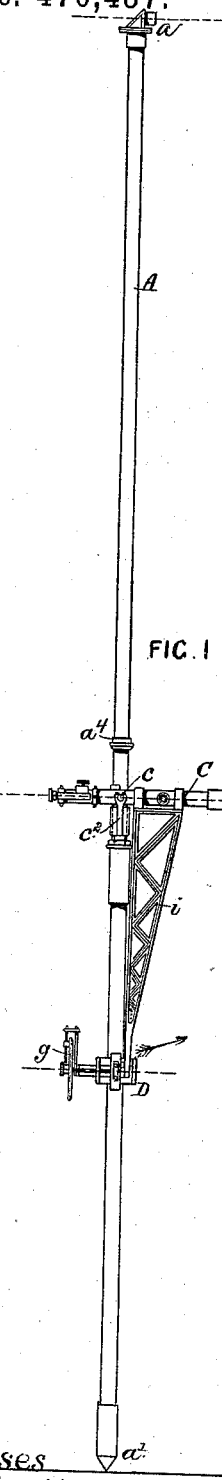
Figure 3:
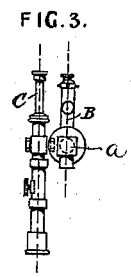
Figure 2:
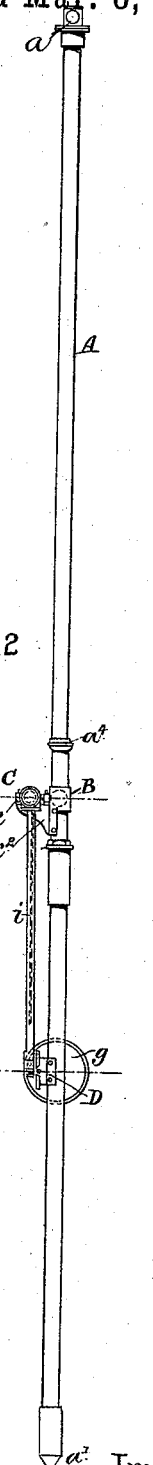
Figure 8:
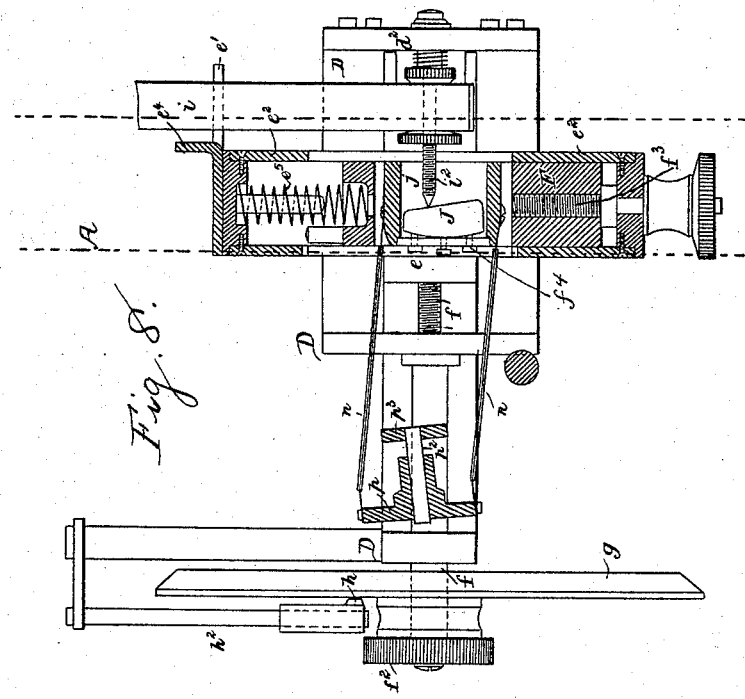

I will describe my invention with reference to the accompanying drawings, in which Figures 1 and 2 show in views at right angles to each other the complete instrument. Fig. 3 is a plan of the telescope. Figs. 4, 5, and 6 are respectively a top plan elevation and vertical section of the top prism or reflector and its box. Fig. 7 is a view of the ring which is to be fixed to the tubular base and which has in it holes to receive the bayonet-points as supports for the instrument when in use. Fig. 8 is a vertical section on the line 1 2 of Fig. 10. Fig. 9 is a side elevation, and Fig. 10 a vertical section, of the means for effecting adjustment and measuring the angle of adjustment, Fig. 9, looking in the same direction as Fig. 8. Figs. 11 and 12 are side and end elevations of a modification of the same. Fig. 13 shows partly in section a portion of the tubular base with the fixed telescope and lower reflector or prism. Figs. 14 and 15 are details of the adjusting device.

According to my invention I provide a perpendicular support, part of which serves as a base of a right-angled triangle for measuring, and consisting of a tube A, which may be a single tube or may be made telescopic for giving a long base in use with compactness for transport. This tube has at its upper end an opening, opposite which is a prism $a$, Figs. 1, 2, 3, 4, 5, and 6, and at its lower end means for securing it in position—as, for example, a spike $a'$ for fixing it in the ground. It may be further supported by means of bayonets or rifles, the points of the bayonets being inserted into holes in the ring $a^4$, fixed to the tubular base. (See Figs. 1, 2, and 7.)

In the tube A, at a suitable distance from the ground, is an object-glass $a^2$, and below this is another prism $a^3$, Fig. 13, to deflect the image into an eye-piece at right angles to the base. This forms one telescope B, and at the side of this is another eye-piece and object-glass, constituting another telescope C, parallel to the telescope B, so that there is a telescope for each eye of the observer, Figs. 1, 2, and 3. The telescope C is for direct observation, and it is centered at $c$ in bearings in a bracket $c^2$, secured to the tube A, so that the said telescope C can be moved vertically through an angle in a plane parallel with the base formed by the tube A of the measuring triangle.

As the tube between the reflecting-glass $a$ and the pivoting-point $c^2$ forms the base of the measuring-triangle, the reflecting-glass being at the right angle thereof, it is by the extent of angular movement which is given to the telescope C (to bring about coincidence of the image of the same object observed by both eyes) that the distance is measured.

To give the distance with great exactitude and facility, I provide two scales, one of which indicates, say, hundreds of yards, and the other of which indicates, say, yards in each of such hundreds, although, of course, I do not limit myself to these precise subdivisions. For this purpose I secure to the support A (by clamping or otherwise) a bracket D, Figs. 1 and 2, in which there is carried a double slide, the first member E of which can be moved by a screw $f$ in a horizontal direction by turning the head $f^2$ of the said screw, the member E being provided with a slide $e$, moving in guides $d$ of the bracket D, Figs. 8, 9, and 10. The screw $f$ is supported by the bracket D, Fig. 14, and moves the member E by turning in a screw-threaded opening in the slide $e$, Fig. 10. The spring $d^2$ bears on and prevents backlash of the member E. The second member F of the slide moves vertically in guides $e^2$, carried by the part E, and is borne upon by a spring $e^5$ to prevent backlash and can be moved by a screw $f^3$ in a direction at right angles to the direction of movement of the first member E. The screw $f$, which gives movement to the first member, has attached to it a disk $g$, Figs. 8, 9, 14, and 15, having a spiral groove on its face, in which works a projection $h$, guided on any suitable guide or bar, such as $h^2$, carried by the bracket D. A rod or girder $i$ is connected to the direct-observation telescope C, Figs. 1 and 2, and this rod enters between guide-bars $e'$, carried by the member E, and has a spring $e^3$, bearing on a projection $e^4$ from the member E. (See Figs. 8 and 9.) The said rod or girder $i$ has on it an adjustable projection $i^2$, Fig. 8, which is kept in contact with an adjustable inclined piece J, carried by the second member F, as hereinafter explained.

When the screw $f$ is operated, it moves the member E, which causes the arm $i$, connected to the direct-observation telescope C, to be moved in the direction of the arrow, Fig. 1, thus tilting the said telescope C on its pivoting-point $c$ to a degree in accordance with the extent of movement of the screw $f$. When the two telescopes B and C are parallel, the projection $h$ is in the outermost convolution of the spiral groove in the disk $g$, and when the direct-observation telescope C is at its greatest angular position relatively to the fixed telescope B the said projection $h$ is in the innermost convolution of the said spiral groove, as shown in Fig. 15. As in the former case, the instrument is in position of infinity, and in the latter case the instrument is in position for observing objects at the least distance for which the instrument is adapted, it follows that I can mark a scale on the spiral of the disk $g$, which scale will show approximately (say in hundreds of yards) the distance of the object observed when the images received by the two telescopes B and C coincide. In order to make a practically accurate subdivision (into, say, yards) of these indications of hundreds of yards, the arm $i$ is moved, as before, to a very slight extent by means of the adjustable inclined piece before named. It is marked J, Figs. 8 and 10, (and in dotted lines in Fig. 9,) and is carried by the piece $f^4$, sliding in the guides $e^2$ of the second member F, so that the said inclined piece can, by means of the screw $f^3$, be moved up and down in a plane at right angles to the movement of the first member E. This inclined piece, on being traversed by the projection $i^2$ from the rod $i$, Fig. 8, will cause the rod $i$, and consequently the telescope C also, to be moved to an extent in accordance with the angle to which the said inclined piece J is adjusted. As the extent of movement of the telescope C for obtaining the exact adjustment for coincidence of the images, as seen by both eyes, varies in an inverse ratio to the distance of the object observed, I alter the angle of the said inclined piece J in accordance with the distance in, say, hundreds of yards, to which the instrument is adjusted by the aforesaid spiral groove in the disk $g$. This I effect by fixing the said inclined piece J in a piece $j$, centered by the pivot $j^2$ in a recess in the member F. (See Fig. 10.) Thus the piece J is capable of being swung, so that the surface presented to the projection $i^2$ may be adjusted to a greater or less degree of inclination from the perpendicular, according to the distance of the object. To make this adjustment automatic, the piece $j$ is connected by spring stretchers or bars $n$, Figs. 8, 9, and 14, to a plate $p$, carried by a stem $p^2$, truly fitting a hole in a projection $p^3$ from a plate P, centered at $p^4$ to one of the guides $e^2$, and to this plate P is secured a cam-piece $l$. This cam-piece $l$ bears on a part $m$, fixed to the bracket D, in which the first member E moves, Figs. 9 and 10. As the part E, with the several above-named parts attached thereto, is moved the cam $l$ rides over the fixed part $m$, Fig. 9, and is raised or lowered, thus raising or lowering the plate P and by means of the connections tilting the piece J. The cam $l$ is so shaped as to always maintain the required ratio between the degree of inclination of the piece J and the position of the projection $h$, or, in other words, to alter the angle of the inclined piece J in accordance with the distance of the object. A spring $p^6$ bears on a projection $p^5$ from the piece P to press the cam $l$ into contact with the fixed part $m$. The stretchers $n$ and the sliding of the projection $p^2$ in the hole in the part $p^3$ permits the proper moving of the inclined piece J as its position is altered.

There is thus in taking an observation a first adjustment, indicated by the spirally-grooved disk $g$ and obtained by the movement of the first member tilting the movable telescope C. During this adjustment the cam $l$ and fixed piece $m$ have caused an angular movement of the inclined piece J to an extent corresponding to the distance in hundreds of yards to which the instrument is adjusted. After the first adjustment has been made by moving the member E the screw $f^3$ of the second member F is operated, and by reason of the angular surface of the piece J bearing on the projection $i^2$ from the telescope arm or girder $i$ when the piece J moves the arm $i$ is further adjusted and tilts the movable telescope to an extent for each yard in accordance with the hundreds of yards to which the instrument has been set by the movement of the first member E.

The screw-head $f^3$ may be marked with a scale to show the finer adjustments of the member E, and a pointer $s$ for the scale may be provided. The scales may be marked on any suitable part of the instrument other than those shown.

In use the instrument is placed so that the distant object is reflected into the telescope B through the medium of the prisms $a$ $a^3$. The screw-head $f^2$ is then turned until the object is within the range of the telescope C. The screw-head $f^3$ is then turned until the object reflected in the telescope C coincides with the object reflected in the telescope B. The approximate distance—say, in hundreds of yards—is then read from the disk $g$, and the distance indicated on the screw-head $f^3$ is then added to obtain the accurate measurement.

In Figs. 11 and 12 I have shown a modification in which the second member F is dispensed with and the arm $i$ is affixed to a piece $q$, which is secured to the first member E, the said piece $q$ consisting of two parts connected by a blade-spring $q^2$ to prevent torsion of the rigid parts. Thus the arm $i$, being connected to the member E, is moved directly by the screw $f$ and the one observation taken from the disk $g$, the finer adjustment not being used with this modification.

In place of a disk $g$ with spiral grooves a cylinder or cone with helically-grooved periphery may be used.

The instrument is capable of use in land or marine service. For example, the tubular metal masts of vessels may be used as a base, provided that the telescopes are in convenient position for such use, and so reliable indications of range can be obtained on shipboard.

I claim as my invention—

1. A telemeter having a support and two telescopes, one fixed to the support and the other adjustable, the eye-pieces of the telescope being arranged near to each other, so that the two eyes of an observer can be applied thereto, and means for adjusting the movable telescope and indicating the adjustment.

2. A telemeter having a tubular support provided with two telescopes, one fixed and the other adjustable, reflecting-glasses within the tube for the fixed telescope, the eye-pieces of the telescopes being arranged near to each other, so that the two eyes of an observer may be applied thereto, and means for adjusting the movable telescope and for indicating the adjustment, substantially as set forth.

3. A telemeter consisting of two telescopes, a vertical support adapted to form the base of a right-angled triangle, and a prism for one of the telescopes fixed at a point on the support corresponding to the right angle of the triangle, and the other telescope pivoted to a point on the support corresponding to the angle at the other end of the base, substantially as and for the purpose set forth.

4. The combination of a support and a telescope pivoted to the support with a bracket attached to the support, a member sliding in guides in the bracket, a second member adapted to slide in the first member, an adjustable incline carried by the second member, means for moving the said members and recording the extent of movement, and an arm having one end attached to the pivoted telescope and the other end engaging in the first member, the said arm provided with a projection bearing on the incline, substantially as and for the purposes set forth.

5. The combination of a support and a telescope pivoted thereto with a bracket removably attached to the support, a member sliding in guides in the bracket, a second member sliding in the first member, an incline pivoted in the second member, a girder attached to the telescope and engaging in the first member and bearing on the incline, and means, substantially as described, to automatically tilt the incline from the movement of the first member, as set forth.

6. The combination of a support and a telescope pivoted thereto with a bracket attached to the support, a member sliding in guides in the bracket, a second member sliding in the first member, an incline pivoted in the second member, a girder attached to the telescope and engaging in the first member and bearing on the incline, a fixed part on the bracket, a cam carried by the second member bearing on the said fixed part on the bracket, and connections between the cam and the incline to transfer the movement of the cam to the incline, all substantially as and for the purpose set forth.

7. A telemeter consisting of a support, two telescopes, one fixed and the other pivoted to the support, a bracket attached to the support, a member adapted to slide on the bracket, an arm attached to the pivoted telescope and engaging in the said member, a screw to move the said member, a grooved disk fixed to the screw, and a pointer carried by the member, substantially as and for the purpose set forth.

In testimony whereof I have signed my name to this specification in the presence of two subscribing witnesses.

E. L. W. HASKETT-SMITH.

Witnesses:
 A. F. HARDY,
  *The Hoates, S. Norwood Park, Surrey.*
 A. K. GREAVES,
  81 *Peterboro Road, Hurlengham.*